US012089790B1

(12) United States Patent
Tan

(10) Patent No.: US 12,089,790 B1
(45) Date of Patent: Sep. 17, 2024

(54) ROTATING ELECTRIC TOWEL RACK

(71) Applicant: Kaiping Futuo Sanitary Ware Co., Ltd., Kaiping (CN)

(72) Inventor: Xiaofu Tan, Changning (CN)

(73) Assignee: Kaiping Futuo Sanitary Ware Co., Ltd., Kaiping (CN)

( * ) Notice: Subject to any disclaimer, the term of this patent is extended or adjusted under 35 U.S.C. 154(b) by 0 days.

(21) Appl. No.: 18/617,552

(22) Filed: Mar. 26, 2024

(30) Foreign Application Priority Data

Jul. 10, 2023 (CN) ........................ 202310841696.X

(51) Int. Cl.
*A47K 10/06* (2006.01)
*H05B 3/40* (2006.01)

(52) U.S. Cl.
CPC ................ *A47K 10/06* (2013.01); *H05B 3/40* (2013.01)

(58) Field of Classification Search
CPC ........ A47K 10/00; A47K 10/02; A47K 10/05; A47K 10/04; A47K 10/06; H05B 3/20; H05B 3/40; H05B 4/44
USPC .......................................................... 219/521
See application file for complete search history.

(56) References Cited

U.S. PATENT DOCUMENTS 5,535,896 A * 7/1996 Morgan, Sr. ........ A47G 25/0685 211/96
6,206,210 B1 * 3/2001 Reed ..................... A47F 5/0087 211/96
6,568,546 B1 * 5/2003 Huang ................... A47K 10/04 211/205
8,322,541 B2 * 12/2012 Maclaren-Taylor .... F24H 3/004 34/106
9,380,890 B2 * 7/2016 Mustari ..................... A47F 5/04
2009/0223912 A1 9/2009 Chen
2012/0211481 A1 * 8/2012 Huang ................... A47K 10/06 219/213
2014/0167473 A1 1/2014 Yang

FOREIGN PATENT DOCUMENTS

CN 208837769 U 5/2019

* cited by examiner

*Primary Examiner* — Sang Y Paik
(74) *Attorney, Agent, or Firm* — Birchwood IP

(57) ABSTRACT

A rotating electric towel rack is provided, which includes a bottom box, a fixed seat, and a swinging towel rod. The bottom box, fixed seat, and swinging towel rod are all hollow structures, the fixed seat is fixedly connected to the bottom box, the swinging towel rod is rotatably connected to the fixed seat; the swinging towel rod is connected to the fixed seat through a rotation shaft sleeve, which includes a rotation inner shaft and an outer fixation sleeve. The rotation shaft sleeve is a hollow structure, an interior of the rotation shaft sleeve is interconnected with an interior of the fixed seat; a fixed hole is provided on the fixed seat, the outer fixation sleeve is fixedly connected to the fixed hole of the fixed seat.

8 Claims, 4 Drawing Sheets

ROTATING ELECTRIC TOWEL RACK

CROSS-REFERENCE TO RELATED APPLICATIONS

This application claims priority to Chinese Patent Application No. 202310841696.X, filed on Jul. 10, 2023, which is hereby incorporated by reference in its entirety.

TECHNICAL FIELD

The present disclosure relates to the field of bathroom and daily necessities technologies, and in particular, to a new type of rotating electric towel rack.

BACKGROUND

With the continuous development of society and economy, towel racks, as high-frequency household items, have gradually increased people's requirements for their various uses. Currently, in existing technologies, towel racks are usually installed next to bathrooms or washbasins, which results in the towels placed on towel racks often being in a damp environment. Towels in damp environments are not only difficult to dry, but can also breed bacteria, thereby posing a threat to people's health.

In the existing technology, the towel rack is equipped with heating wires or can be quickly dried by heating the towel to improve the comfort of the equipment. However, in the existing technology, the towel rack is not flexible enough to use.

For example, a Chinese invention patent of a heating towel rack (application number of CN201820490341.5) discloses that it includes a first towel rack, at least one second towel rack, and multiple heating mechanisms; the at least one second towel rack can be detachably connected to the first towel rack, any two second towel racks can be detachably connected with each other. The multiple heating mechanisms are respectively arranged in the first towel rack and the second towel rack; the first towel rack includes: a first pole, a second pole, and multiple first towel poles. The first pole is parallel to the second pole, two ends of the multiple first towel poles are respectively connected to the first pole and the second pole; an internal of the first pole is hollow, an end of the first pole has a power input line, the other end thereof has a first male plug; the second towel rack includes: a third pole, a fourth pole, and multiple second towel poles. The third pole is parallel to the fourth pole, two ends of the multiple second towel poles are respectively connected to the third pole and the fourth pole; an internal of the third pole is hollow, an end of the third pole has a first female plug, the other end thereof has a second male plug. The first female plug of any second towel rack corresponds to the first male plug of the first towel rack, and the second male plug of any two second towel racks corresponds to the first female plug; one end of the fourth pole can be detachably connected to the second pole; multiple heating mechanisms are respectively arranged in multiple first towel poles and second towel poles, and are electrically connected to the power input line. The multiple heating mechanisms are electrically connected in parallel. The problem it aims to solve is that all towel racks on the market are fixed structures and cannot be extended to meet the needs of different places, which results in poor flexibility. However, by increasing the length of the first pole and the number of first towel pole through splicing structures, the essence is to increase the number of towels that can be hung, but it cannot increase its flexibility in use.

In people's daily use, the position of towel that can be hung affects its convenience. How to change the position of towel that can be hung and increase the flexibility of hanging angle of towel is an urgent problem in existing technology.

SUMMARY

The purpose of the present disclosure is to provide a novel rotating electric towel rack to solve the problems of towel racks being unable to quickly dry towels and inconvenient adjustment of an angle of a towel rod in the prior art.

To achieve the above objectives, the technical solution of the present disclosure is as following.

A rotating electric towel rack includes a bottom box, a fixed seat, and a swinging towel rod; the bottom box, the fixed seat, and the swinging towel rod are all hollow structures, the fixed seat is fixedly connected to the bottom box, the swinging towel rod is rotatably connected to the fixed seat; the swinging towel rod is rotatably connected to the fixed seat through a rotation shaft sleeve, which includes a rotation inner shaft and an outer fixation sleeve; the rotation shaft sleeve is a hollow structure, an interior of the rotation shaft sleeve is interconnected with an interior of the fixed seat; the fixed seat is provided with a fixed hole, the outer fixation sleeve is fixedly connected to the fixed hole of the fixed seat, the rotation inner shaft is rotatably connected to an interior of the outer fixation sleeve, the swinging towel rod is fixedly connected to an end of the rotation inner shaft away from the fixed seat, an interior of the swinging towel rod is interconnected with an interior of the rotation inner shaft.

In an embodiment of the present disclosure, the swinging towel rod rotates around a circumference direction of the bottom box on the fixed seat, a rotatable angle of the swinging towel rod is between 0-180°.

In an embodiment of the present disclosure, a notch is provided on the fixed seat, the fixed hole is provided on one side wall of the notch.

In an embodiment of the present disclosure, the bottom box is provided with several wiring holes, the bottom box is fixedly connected with several internal fixation sleeves; each internal fixation sleeve is a hollow structure with openings at two ends, each internal fixation sleeve is interconnected with an interior of the bottom box through the wiring holes.

In an embodiment of the present disclosure, an end of the inner fixation sleeve far from the bottom box is fixedly connected to a connection plate with a central hole.

In an embodiment of the present disclosure, the inner fixation sleeve and connection plate are both provided in the fixed seat.

In an embodiment of the present disclosure, a tail end of the bottom box is fixedly connected to a control box, the control box is connected to a power supply.

In an embodiment of the present disclosure, the rotating electric towel rack further includes a wire, one end of the wire is electrically connected to the control box, the other end thereof is electrically connected to a heating wire.

In an embodiment of the present disclosure, the bottom box is a hollow structure with a long strip shape.

Compared with existing technology, the advantages and effects of the present disclosure are:

The swinging towel rod of the present disclosure is rotatably connected to a fixed seat through a rotation shaft sleeve, the fixed seat is fixedly connected to a bottom box.

The swinging towel rod can rotate around a circumference direction of the bottom box on the fixed seat, thereby adjusting an angle of the swinging towel rod for placing the towel, quickly placing angle and position of the towel, and being flexible to use.

The present disclosure can quickly dry the towel on the swinging towel rod by generating heat, improving the comfort of the equipment, preventing the growth of bacteria in the towel, and reducing the threat of bacteria to human health.

BRIEF DESCRIPTION OF DRAWINGS

In order to provide a clearer explanation of the embodiments of the present disclosure or the technical solutions in the prior art, a brief introduction will be given below to the accompanying drawings required in the embodiments or prior art description. It is obvious that the accompanying drawings in the following description are only some embodiments of the present disclosure. For those skilled in the art, other accompanying drawings can be obtained based on these drawings without the need for creative work.

Numeral reference: 1. Bottom box; 11. Wiring hole; 2. Swinging towel rod; 3. Fixed seat; 31. Inner fixation sleeve; 32. Connection plate; 321. Center hole; 33. Fixed hole; 34. Notch; 4. Rotation shaft sleeve; 41. Rotation inner shaft; 42. Outer fixation sleeve; 5. Control box.

DESCRIPTION OF EMBODIMENTS

The following will provide a clear and complete description of the technical solution in the embodiments of the present disclosure, in combination with the accompanying drawings. Obviously, the described embodiments are only a part of the embodiments of the present disclosure, not all of them. Based on the embodiments in the present disclosure, all other embodiments obtained by ordinary technicians in the art without creative work fall within the protection scope of the present disclosure.

Embodiment 1

Figure 1:
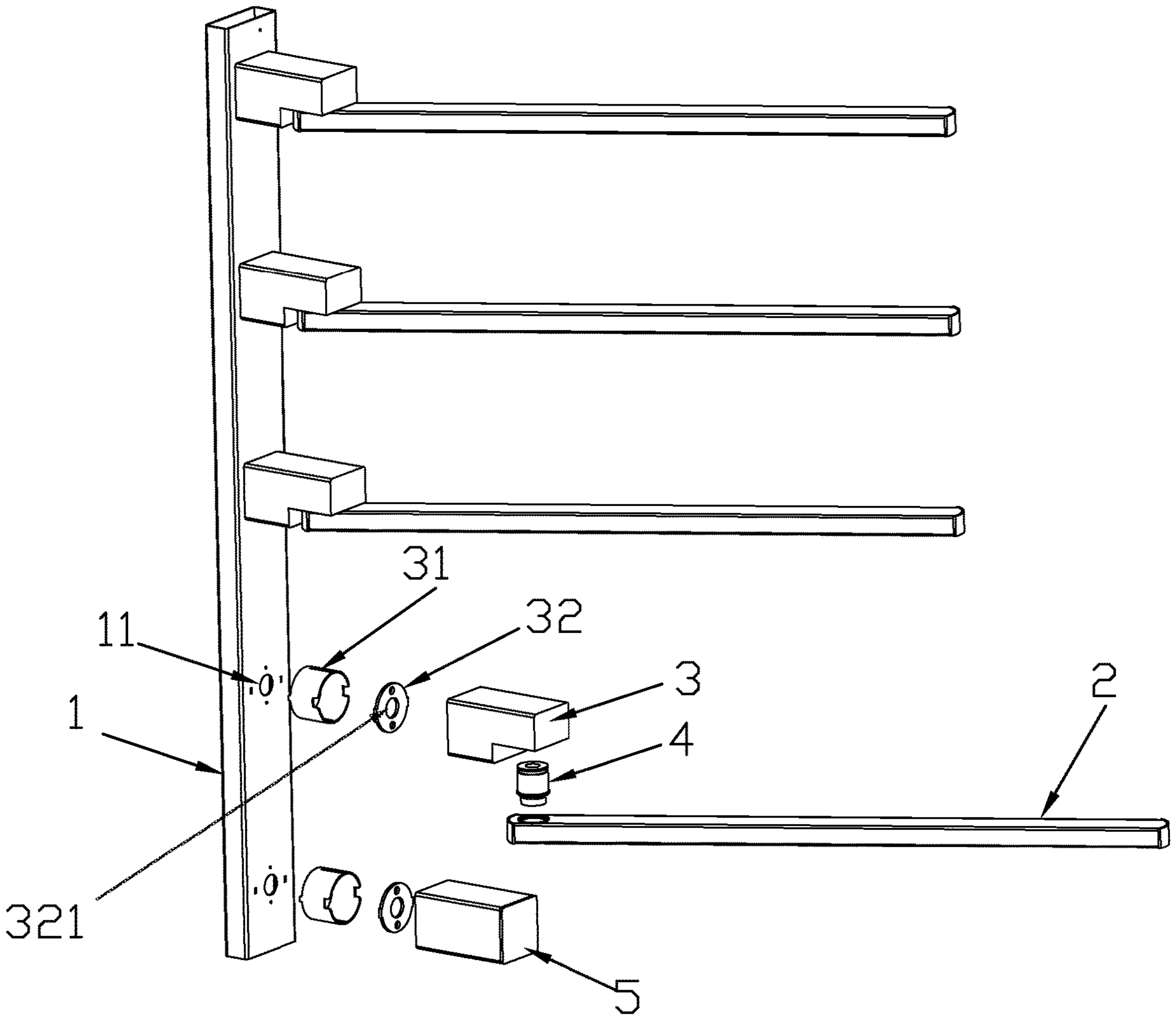
FIG. 1 is a schematic diagram of a partial structural decomposition of the present disclosure.
Figure 2:
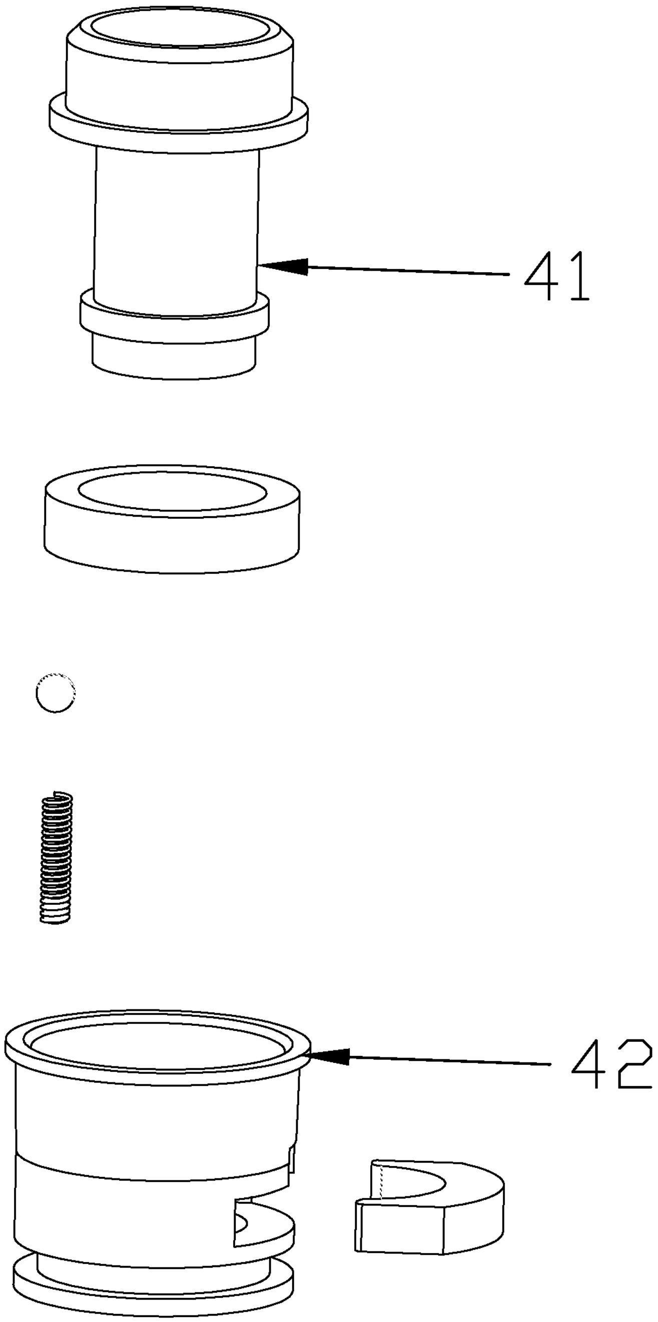
FIG. 2 is a decomposed structure diagram of a rotation shaft sleeve of the present disclosure.
Figure 3:
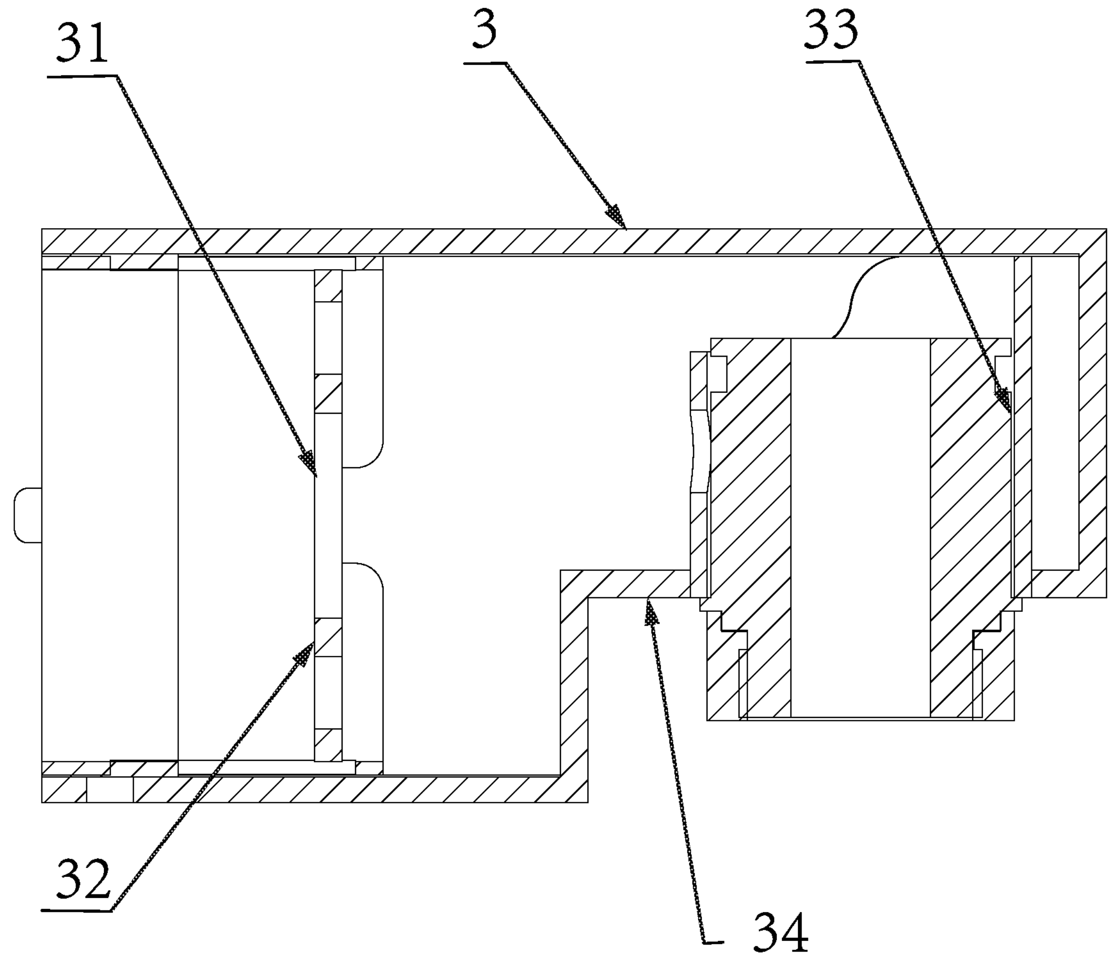
FIG. 3 is a cross-sectional view of a connection between a fixed seat and the rotation shaft sleeve of the present disclosure.
Figure 4:
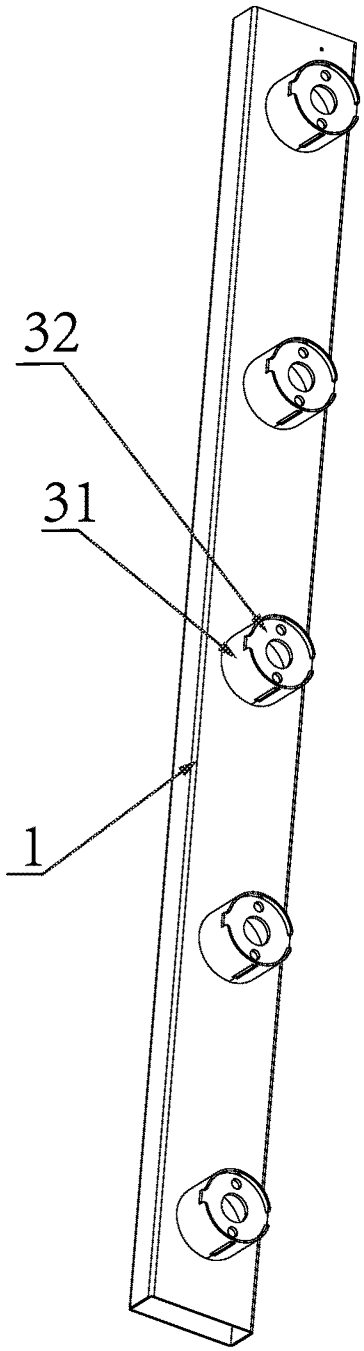
FIG. 4 is a schematic diagram of a connection between a bottom box and an inner fixation sleeve of the present disclosure.

As shown in FIGS. 1 to 4, a new type of rotating electric towel rack includes a bottom box 1, a fixed seat 3, and a swinging towel rod 2. The bottom box 1, the fixed seat 3, and the swinging towel rod 2 are all hollow structures, the fixed seat 3 is fixedly connected to the bottom box 1, the swinging towel rod 2 is rotatably connected to the fixed seat 3; the swinging towel rod 2 is rotationally connected to the fixed seat 3 through a rotation shaft sleeve 4, which includes a rotation inner shaft 41 and an outer fixation sleeve 42. The rotation shaft sleeve 4 is a hollow structure, an interior of the rotation shaft sleeve 4 is interconnected with an interior of the fixed seat 3. The fixed seat 3 is provided with a fixed hole 33, the outer fixation sleeve 42 is fixedly connected to the fixed hole 33 of the fixed seat 3. The rotation inner shaft 41 is rotatably connected to an interior of the outer fixation sleeve 42, the swinging towel rod 2 is fixedly connected to an end of the rotation inner shaft 41 away from the fixed seat 3. An interior of the swinging towel rod 2 is interconnected with an interior of the rotation inner shaft 41.

In this embodiment, the swinging towel rod 2 rotates around a circumference direction of the bottom box 1 on the fixed seat 3, a rotatable angle of the swinging towel rod 2 is between 0-180°.

In this embodiment, a notch 34 is provided on the fixed seat 3, and the fixed hole 33 is provided on a side wall of the notch 34.

In this embodiment, the bottom box 1 is provided with several wiring holes 11, the bottom box 1 is fixedly connected with several inner fixation sleeves 31. Each inner fixation sleeve 31 is a hollow structure with openings at two ends, each inner fixation sleeve 31 is interconnected with an interior of the bottom box 1 through the wiring holes 11.

In this embodiment, the inner fixation sleeve 31 is fixedly connected to a connection plate 32 with a central hole 321 at an end away from the bottom box 1.

In this embodiment, both the inner fixation sleeve 31 and the connection plate 32 are located in the fixed seat 3.

In this embodiment, a tail end of the bottom box 1 is fixedly connected to a control box 5, which is connected to a power supply.

In this embodiment, the rotating electric towel rack further includes a wire (not shown in the figures), an end of which is electrically connected to the control box 5, and the other end of the wire is electrically connected to a heating wire (not shown in the figures), the heating wire is located in the swinging towel rod 2.

In this embodiment, the bottom box 1 is a hollow structure with a long strip shape.

When assembling the present disclosure, the wires pass sequentially through the swinging towel rod 2, the rotation inner shaft 41, the fixed seat 3, the connection plate 32, the inner fixation sleeve 31, and the bottom box 1. Then, the wires are electrically connected to the control box 5, the other end of the wires is electrically connected to a heating wire, the heating wire is arranged in the swinging towel rod 2; the connection plate 32 is then fixed to an end face of the inner fixation sleeve 31, the inner fixation sleeve 31 is fixed to the bottom box 1. When fixing, a center of the inner fixation sleeve 31 faces one of the wiring holes 11 in the bottom box 1, and the wiring holes 11 face the center hole 321 of the connection plate 32; next, the fixed seat 3 is sleeved on an outer circumference of the inner fixation sleeve and it is fixed on the bottom box 1.

Before installing the swinging towel rod 2, the rotation inner shaft 41 is first fixed to the outer fixation sleeve 42 to form the rotation shaft sleeve 4. The rotation shaft sleeve 4 is then fixed to the fixed hole 33 of the fixed seat 3, and the swinging towel rod 2 is then fixed to the rotation inner shaft 41 that extends outward.

Embodiment 2

As shown in FIGS. 1 to 4, a rotating electric towel rack includes a bottom box 1, a fixed seat 3, and a swinging towel rod 2. The bottom box 1, the fixed seat 3, and the swinging towel rod 2 are all hollow structures, the fixed seat 3 is fixedly connected to the bottom box 1, the swinging towel rod 2 is rotatably connected to the fixed seat 3; the swinging towel rod 2 is rotationally connected to the fixed seat 3 through a rotation shaft sleeve 4, the rotation shaft sleeve 4 includes a rotation inner shaft 41 and an outer fixation sleeve 42. The rotation shaft sleeve 4 is a hollow structure, an interior of the rotation shaft sleeve 4 is interconnected with an interior of the fixed seat 3; the fixed seat 3 is provided with a fixed hole 33, the outer fixation sleeve 42 is fixedly connected to the fixed hole 33 of the fixed seat 3. The rotation inner shaft 41 is rotatably connected to an interior of the outer fixation sleeve 42, the swinging towel rod 2 is fixedly connected to an end of the rotation inner shaft 41 away from the fixed seat 3. An interior of the swinging towel rod 2 is interconnected with an interior of the rotation inner shaft 41.

In this embodiment, the swinging towel rod 2 rotates around a circumference direction of the bottom box 1 on the fixed seat 3, a rotatable angle of the swinging towel rod 2 is between 0-180°.

In this embodiment, a notch 34 is provided on the fixed seat 3, the fixed hole 33 is provided on a side wall of the notch 34.

In this embodiment, the bottom box 1 is provided with several wiring holes 11, the bottom box 1 is fixedly connected with several inner fixation sleeves 31. Each inner fixation sleeve 31 is a hollow structure with openings at two ends, each inner fixation sleeve 31 is interconnected with an interior of the bottom box 1 through the wiring holes 11.

In this embodiment, the inner fixing sleeve 31 is fixedly connected to a connection plate 32 with a central hole 321 at an end away from the bottom box 1.

In this embodiment, both the inner fixation sleeve 31 and the connection plate 32 are located in the fixed seat 3.

In this embodiment, a tail end of the bottom box 1 is fixedly connected to a control box 5, which is connected to a power supply.

In this embodiment, the rotating electric towel rack further includes a wire (not shown in the figures), an end of which is electrically connected to the control box 5, and the other end of the wire is electrically connected to a heating wire (not shown in the figures), the heating wire is arranged in the swinging towel rod 2.

In this embodiment, the bottom box 1 is a cylindrical hollow structure, and the twisting towel rod 2 is a cylindrical hollow structure.

When assembling the present disclosure, the wires pass sequentially through the swinging towel rod 2, the rotation inner shaft 41, the fixed seat 3, the connection plate 32, the inner fixation sleeve 31, and the bottom box 1. Then, the wires are electrically connected to the control box 5, and the other end of the wires is electrically connected to a heating wire, the heating wire is arranged in the swinging towel rod 2; the connection plate 32 is then fixed to an end face of the inner fixation sleeve 31, the inner fixation sleeve 31 is then fixed to the bottom box 1. When fixing, a center of the inner fixation sleeve 31 faces one of the wiring holes 11 in the bottom box 1, and the wiring holes 11 face the center hole 321 of the connection plate 32, next, the fixed seat 3 is sleeved on an outer circumference of the inner fixed sleeve and it is fixed on the bottom box 1.

Before installing the swinging towel rod 2, the rotation inner shaft 41 is first fixed to the outer fixation sleeve 42 to form the rotation shaft sleeve 4. The rotation shaft sleeve 4 is fixed to the fixed hole 33 of the fixed seat 3, the swinging towel rod 2 is then fixed to the rotation inner shaft 41 that extends outward.

Based on the embodiments in the present disclosure, all other embodiments obtained by ordinary technicians in the art without creative work, any modifications, equivalent substitutions, improvements, etc., shall be included in the protection scope of the present disclosure.

What is claimed is:

1. A rotating electric towel rack, comprising a bottom box, a fixed seat, and a swinging towel rod; wherein the bottom box, the fixed seat, and the swinging towel rod are all hollow structures, the fixed seat is fixedly connected to the bottom box, the swinging towel rod is rotatably connected to the fixed seat;

the swinging towel rod is rotatably connected to the fixed seat through a rotation shaft sleeve, which comprises a rotation inner shaft and an outer fixation sleeve; the rotation shaft sleeve is a hollow structure, an interior of the rotation shaft sleeve is interconnected with an interior of the fixed seat;

the fixed seat is provided with a fixed hole, the outer fixation sleeve is fixedly connected to the fixed hole of the fixed seat, the rotation inner shaft is rotatably connected to an interior of the outer fixation sleeve, the swinging towel rod is fixedly connected to an end of the rotation inner shaft away from the fixed seat, an interior of the swinging towel rod is interconnected with an interior of the rotation inner shaft.

2. The rotating electric towel rack according to claim 1, wherein the swinging towel rod rotates around a circumference direction of the bottom box on the fixed seat, a rotatable angle of the swinging towel rod is between 0-180°.

3. The rotating electric towel rack according to claim 1, wherein a notch is provided on the fixed seat, the fixed hole is provided on a side wall of the notch.

4. The rotating electric towel rack according to claim 1, wherein the bottom box is provided with several wiring holes, the bottom box is fixedly connected with several internal fixation sleeves; each internal fixation sleeve is a hollow structure with openings at two ends, each internal fixation sleeve is interconnected with an interior of the bottom box through the wiring holes.

5. The rotating electric towel rack according to claim 4, wherein an end of the inner fixation sleeve far from the bottom box is fixedly connected to a connection plate with a central hole.

6. The rotating electric towel rack according to claim 5, wherein the inner fixation sleeve and connection plate are both provided in the fixed seat.

7. The rotating electric towel rack according to claim 1, wherein a tail end of the bottom box is fixedly connected to a control box, the control box is connected to a power supply.

8. The rotating electric towel rack according to claim 1, wherein the bottom box is a hollow structure with a long strip shape.

* * * * *